United States Patent Office.

FRIEDRICH FEUSTELL, OF ALTONA, ASSIGNOR TO HENRY FUCHS, OF OFFENBACH-ON-THE-MAIN, GERMANY.

INSECTICIDE.

SPECIFICATION forming part of Letters Patent No. 378,583, dated February 28, 1888.

Application filed January 20, 1887. Serial No. 324,887. (No specimens.)

*To all whom it may concern:*

Be it known that I, FRIEDRICH FEUSTELL, a subject of the Emperor of Germany, and resident at Altona, Germany, have invented new and useful Improvements in Antiphylloxera Preparations, of which the following is a specification.

I have discovered that tannin and ammonia destroy, respectively, the insects that infest the vine and their germs. The tannin seems to act on the glutinous matter of the living insect in such a manner as to render its continued existence impossible. It does not, however, affect the germs which are protected in eggs that the tannin does not attack. Ammonia, however, at once penetrates the egg and destroys the germ. In order to apply the ammonia in the most effective manner it should be used in the nascent state. For this purpose preferably ammonium sulphate is used, this becoming decomposed in the soil the calcareous ingredients of which take the sulphuric acid, forming manure and liberating the ammonia. When the soil contains little calcareous matter, it is better to mix the ammonium sulphate with potassium silicate. In the soil this mixture becomes decomposed, the silicic acid of the silicate combining with the lime or alumina of the ground and the sulphuric acid of the sulphate combining with the potassium of the silicate and liberating the ammonia. The following mixture is found practically serviceable: one to five parts, by weight, of tannin, two parts of ammonium sulphate, and two parts of potassium silicate in solution at 36° Baumé, the whole dissolved in about one hundred parts of water. Pure tannin may be used, or substances containing tannin in such quantity as will give about the proportion mentioned. The solution is applied in the vineyard in the following manner: The spaces between the rows of vines are opened to a depth of about eighteen inches at a distance of about fifteen inches from the vine-stems, exposing their finer rootlets. These are freely watered with the solution, then covered with four or five inches of soil saturated with the solution, and then the rest of the soil is replaced over them. About fourteen days after this operation the soil that was not in the first instance disturbed is opened close up to the vine-stems, exposing the main roots. These are now watered with the solution, then covered with four or five inches of soil saturated with the solution, and the rest of the soil is replaced. It is advisable to apply this treatment under ground during wet weather.

In dry weather the vines above ground should be liberally watered with the solution. The work should be done immediately before the beginning of the period of second growth, and for the sake of economy it may be combined with the annual manuring of the vineyard.

The proportions of the several ingredients in the preparation may be to some extent varied without materially affecting its properties, and therefore I do not limit myself strictly to said proportions; but

What I claim as my invention, and desire to secure by Letters Patent, is—

1. An antiphylloxera preparation consisting of tannin and sulphate of ammonia in the proportion of two parts of the latter to from one to five parts of the former, substantially as herein described.

2. The antiphylloxera preparation consisting of about one to five parts, by weight, of tannin, about two parts, by weight, of ammonium sulphate, and about two parts, by weight, of potassium silicate, substantially as herein described.

In testimony whereof I have signed my name to this specification in the presence of two subscribing witnesses.

FRIEDRICH FEUSTELL.

Witnesses:
 FRANZ HASSLACHER,
 JOSEPH PATRICK.